United States Patent
Gustafson et al.

[15] 3,673,657
[45] July 4, 1972

[54] DEVICE FOR CLAMPING A CUTTING INSERT TO A SEAT OF A TOOLHOLDER BODY

[72] Inventors: Manfred Wallace Gustafson; Torsten Sandrud, both of Fagersta, Sweden

[73] Assignee: Fagersta Bruks Aktiebolag, Fagersta, Sweden

[22] Filed: Nov. 14, 1969

[21] Appl. No.: 876,896

[30] Foreign Application Priority Data

Nov. 22, 1968 Sweden..............................15,944/68
Nov. 22, 1968 Sweden..............................15945/68

[52] U.S. Cl...................................................29/105
[51] Int. Cl...................................................B26d 1/12
[58] Field of Search.................................29/96, 105, 105 A

[56] References Cited

UNITED STATES PATENTS

| 2,930,111 | 3/1960 | St. Clair | 29/96 |
| 3,056,186 | 10/1962 | Greenleaf | 29/105 |
| 3,345,721 | 10/1967 | Garih | 29/105 |

Primary Examiner—Harrison L. Hinson
Attorney—Bauer and Goodman

[57] ABSTRACT

A device for clamping a cutting insert to a seat of a toolholder body, said seat having a supporting and a pair of transversely oriented holding surfaces against which the insert is firmly wedged during the threaded engagement of a clamp screw in an inclined threaded opening in the toolholder seat. The inclination of the threaded opening is such as to produce the desired wedging effect against one holding surface during rotative or tightening manipulation of the screw, while said rotative screw movement produces the wedging effect against the other transverse holding surface.

4 Claims, 7 Drawing Figures

INVENTORS
MANFRED WALLACE GUSTAFSON
& TORSTEN SANDRUD
BY

ATTORNEYS

DEVICE FOR CLAMPING A CUTTING INSERT TO A SEAT OF A TOOLHOLDER BODY

The present invention relates to an improved toolholder, and has as its main object to provide a toolholder construction which is simple, yet effective to firmly clamp the cutting tool or insert in place.

A toolholder construction demonstrating objects and advantages of the present invention includes an insert clamping device in the form of a screw head with a peripheral surface which is essentially conically tapering towards the threaded portion of the screw and is arranged, when the screw is tightened, to press the insert by wedge action in a direction towards a seat holding surface by engagement with a side of the cutting insert. That is, the screw head wedges itself within a progressively diminishing clearance space between it and the insert and, as a consequence, presses the insert sufficiently firmly against the seat holding surface to hold the insert in place during cutting use of the insert.

Given below is a more detailed description of embodiments of the invention, made with reference to the accompanying drawing, said description disclosing further characterizing features of the invention.

Figure 4:
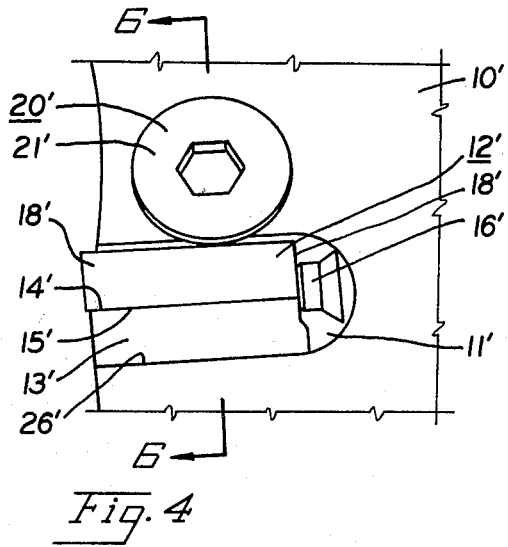
FIGS. 4–7 illustrate additional embodiments, to wit.
Figure 6:
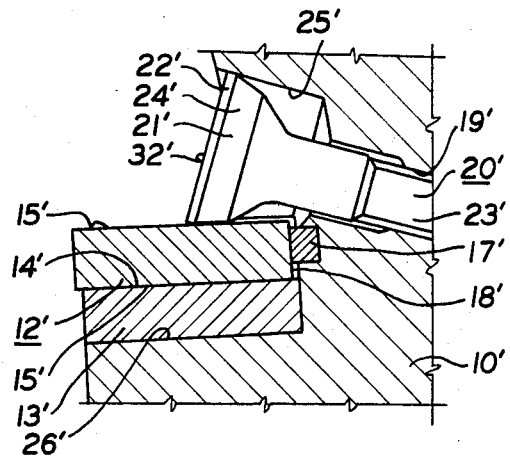
Figure 5:
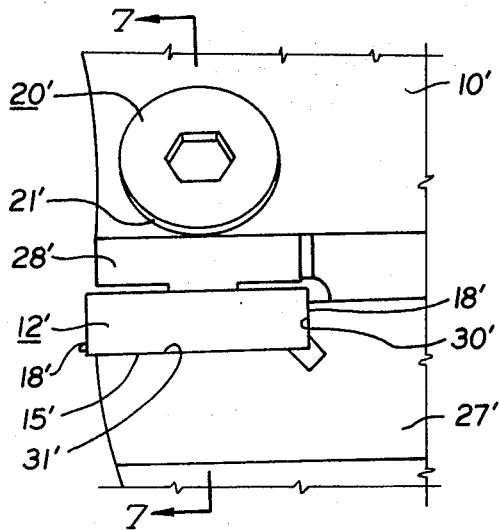
Figure 7:
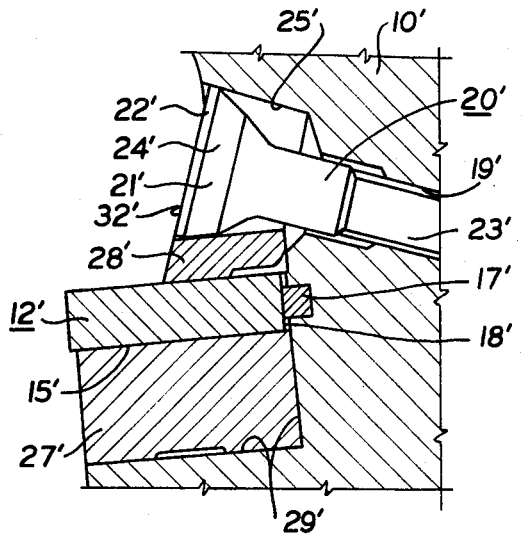

FIGS. 4 and 5 are front elevational sectional views of exemplary clamping devices; and FIGS. 6 and 7 are side elevational views, in section, taken along lines 6—6 of FIG. 4 and line 7—7 of FIG. 5, respectively.

EMBODIMENT OF FIGS. 1–3

Figures 1, 2:
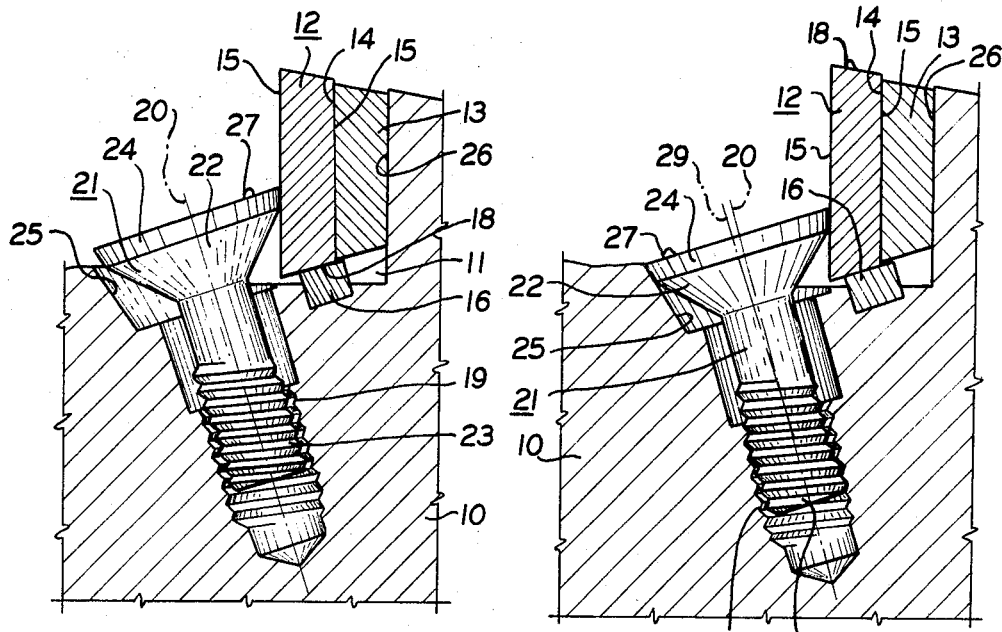
FIG. 1 is an elevational sectional view of a mill with a clamping device according to the invention, the cutting insert being in an unclamped condition.
FIG. 2 is a view similar to FIG. 1 showing the clamping device in the position of clamping the cutting insert.

In FIGS. 1 through 3, 10 refers to a portion of the toolholder body of a mill, the axis of rotation of which extending essentially perpendicularly to the planes of FIGS. 1 and 2. Portion 10 has a recess 11, in which is formed a seat for a cutting insert 12. The seat is formed by a first holding surface 14 for one of the side walls or broad sides 15 of the insert, said first holding surface 14 in the illustrated embodiment being formed on a separate anvil 13. Seat 11 also includes a supporting type surface 16 and a second holding surface 17 for supporting two of the edge sides 18 essentially in the radial and axial direction, respectively. In a lengthwise partly tapped opening 19 disposed adjacent the seated position of the insert 12, the axis of said opening forming an acute and preferably small angle with the broad sides 15 of the cutting insert 12, there is disposed a clamp screw 21, the head 22 of which is adapted to abut the broad side of the cutting insert facing outwardly from the first holding surface 14 in order to urge the cutting insert, when said screw is tightened, through movement in a direction towards said first holding surface 14, said supports surface 16, 17 said second holding surface.

The screw head has a conical surface which is essentially tapering towards the threaded portion of the screw and is adapted to urge the insert by wedge action in a direction towards the holding surface 14, when the screw is tightened, by engagement with the side of the insert 12 faced from said surface. On its other side the screw head engages a further or third holding surface 25 of the portion 10, said holding surface being inclined essentially in correspondence with said conical surface. Furthermore, the mutual disposition of the seat 14, 16, 17, the opening 19 and the surface 25 is such, that, when the screw is tightened, the conical surface 24 will establish contact with said surface 25. In other words, the radical distance between a position on the axis 20 of the opening 19 and the broad side of the insert 12 faced to the screw is less than the radical distance between said position and the surface 25. In FIG. 1 is shown the position of the device at the beginning of the tightening of the screw 21, the surface 24 of the left hand threaded screw, owing to the rotation of the screw, urging the cutting insert through movement in a direction towards the second holding surface 17 and, owing to the movement of the screw into the opening 19, urging the cutting insert in a direction towards the support surface 16. In FIG. 2 the device is shown in a position in which the surface 24 has ultimately reached contact with said third holding surface 25 of the mill body, and a high clamping pressure is achieved on the cutting insert without applying any heavy stresses to the threads of the screw 21 and those of the opening 19.

Figure 3:
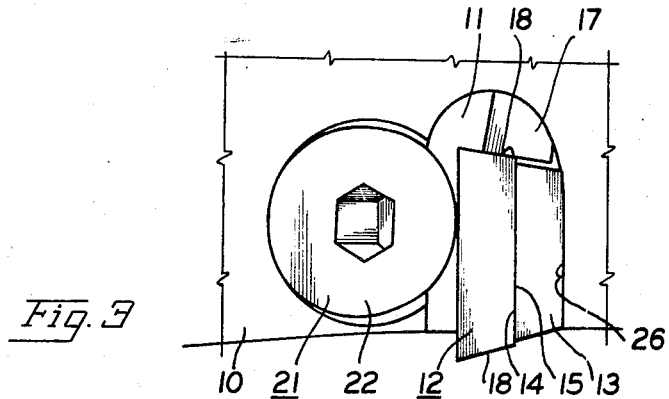
FIG. 3 is a plan view of the clamping device according to FIGS. 1 and 2.

According to FIGS. 1 through 3, the supporting surface 14 is formed on a separate anvil 13 supported by a surface 26 of the mill body. It is, however, within the scope of the invention to arrange the supporting surface for the anvil on a separate toolholder clampable in the mill body, as known per se, and also to omit said anvil and permit body surface 26 to perform its function. Furthermore, a chipbreaker, as indicated at 28′ in the FIG. 7 embodiment, could be arranged between the cutting insert 12 and the conical surface 24 of the screw 21.

The conical surface 24 of the screw head 22 is preferably inclined to provide linear contact with the cutting insert 12 or with the chipbreaker, if any, respectively, and also with the surface 25 of the mill body. The surface 24 is advantageously provided with a top gripping area of relatively small length, as shown at 24, and the surface 25 could preferably be formed by the side wall of a conically shaped counterbore in the opening 19, the outer end surface 27 of the screw head 22 preferably covering the mouth of the opening 19 as completely as possible when the screw 21 clamps the insert 12, as shown in FIGS. 2 and 3.

When tightening the screw 21, in order to delay the time of wedging contact between the surface 24 and the cutting inset 12 until entry of this surface below the level of the surface 25, in accordance with an embodiment of the invention, there is advantageously provided a certain amount of clearance between the threads of the screw 21 and those of the opening 19. Thus, in response to the engagement of the surface 24 with the cutting insert, when said tightening takes place, the screw is pivoted to a position in which the surface establishes said contact with the reaction surface 25. This condition is shown in FIGS. 1 and 2. In FIG. 1 there is a lengthwise essentially equally formed clearance 28 along the portion 23 between the threads of the screw 21 and those of the opening 19 and the axis of the screw coincides with the axis 20 of the opening. In FIG. 2 the screw 21 has been pivoted in a direction towards the surface 25, whereby a clearance no longer exists between said threads at the upper left and the lower right portion, as seen in FIG. 2, of the area in which the threads of the screw are in engagement with those of the opening, the axis 29 of the screw being inclined to the axis 20 of the opening. However, the same effect can be achieved by making the shank of the screw flexible to a certain extent so that the clamp screw is bent until the surface 24 establishes contact with the reaction surface of the mill body, and it is also within the scope of the invention to form the device in a manner causing said movement of the surface 24 towards the surface 25 to take place during a combined pivoting and bending of the screw.

Although the just described clamping embodiment is useful with a mill and a positive rake insert, it is not limited to this use but may be used together with other types of cutting tools with mechanically clamped cutting inserts as well as in connection with negative rake inserts.

EMBODIMENTS OF FIGS. 4–7

In FIGS. 4 and 6, the part 10′ has a recess 11′ where a seat for an indexable insert 12′ is constructed. The seat is formed of first holding surface 14′ for one of the broad sides 15′ of the insert, constructed on a separate anvil 13′ and a second holding surface 16′ a supporting type surface and 17′ in order to support two of the edge sides 18' of the insert mainly in the axial and radial direction respectively of the milling cutter. In a hole 19', threaded along part of its length, located beside the seat in the tool body 10', the center axis of which forms a sharp and preferably small angle with the broad sides 15' of the insert 12', a locking screw 20' is attached, the head of which is arranged to act on the broad side of the insert, turned away from the first holding surface 14', and in order to press the insert at the tightening of the screw in the direction of the first holding surface 14' and the second holding surface 16', supporting type surface 17'.

The screw head 21' has both a mainly cylindrical casing surface 22' and also a casing surface 24' that is mainly tapering conically to the threaded part 23' of the screw 20'. The conical casing surface 24' which is located preferably close to the cylindrical casing surface 22', is arranged so as to press the insert 12' at the tightening of the screw 20' through the wedge effect in the direction of the supporting face, whilst the force of reaction is absorbed at the side of the screw head 21' opposite to the insert, mainly only by means of the cylindrical casing surface 22' resting against a surface 25' on the part 10', running mainly parallel with the axis of the hole 19'. The screw 20' is then assumed to be left-hand by means of which the conical casing surface 24' at the tightening of the screw, on account of the rotation of the screw acts on the insert in the direction of the second holding surface 16', and on account of the motion of the screw into the hole 19' acts on the insert in the direction of the support surface 17' so as to ensure that it rests correctly against the surfaces 16', 17'.

According to FIGS. 4 and 6, the first holding surface 14', is constructed on a separate anvil 13' which rests against a surface 26' on the body of the milling cutter. However, it lies within the scope of the invention to arrange, in a known manner, the supporting face for the anvil on a separate toolholder that can be clamped on the body of the milling cutter, also to leave out the anvil and to construct the supporting surface for the anvil directly on the body of the milling cutter or the toolholder, if any. Furthermore, between the insert 12' and the casing surface 24' of the screw head 21' a chipbreaker can be arranged.

To illustrate the above possibilities of variation, a device is shown in FIGS. 4 and 7, differing from the device according to FIGS. 4 and 5 only thereby that the seat for the insert 12' is arranged on a separate toolholder 27' and that the conical casing surface 24' of the locking screw 20' acts on the insert via a chipbreaker 28'. The toolholder and the chipbreaker extending along the holder are received in a mainly axial slot 29' in the body of the milling cutter and are supposed to be capable of being clamped in an ordinary manner in the slot 29' with the aid of a clamping device (not shown), such as a wedge or a screw similar to the above, besides with the aid of the shown screw 20'. The radial support 17' for the insert is arranged on the body of the milling cutter whilst the axial support 30' and the supporting face 31' for the insert are constructed directly on the toolholder.

The conical casing surface 24' of the screw head 21' has contact with the insert 12' or with the chipbreaker 28', if any, as shown. The reaction surface 25' can be formed advantageously of the side wall of an enlarged, cylindrical counterbore opening of the hole 19' and it is then favorably, if the opening part mentioned has a diameter, only slightly exceeding the diameter of the cylindrical casing surface 22', and if the external end surface 32' of the screw head is located by the opening of the hole 19' when the screw 20' locks the insert 12', as shown in FIGS. 6 and 7.

A latitude of modification, change and substitution is intended in the foregoing disclosure and in some instances some features of the invention will be employed without a corresponding use of other features.

We claim:

1. A toolholder construction comprising:
   a toolholder body (10) having a means (16) defining an insert support surface and a pair of transversely oriented first (14) and second (17) holding surfaces bordering said support surface defining means (16) and cooperating therewith to define a tool insert seat (11),
   a tool insert (12) of a prescribed shape presenting an opposite first and second pair of side walls (15) and an end wall (18) therebetween operatively mounted on said support surface defining means (16) within said insert seat (11), with said second side wall (15) and said end wall (18) in loose engagement respectively against said first (14) and second (17) holding surfaces,
   said tool holder body (10) having a threaded opening (19) therein located adjacent to said support surface defining means (16) and adjacent said tool insert (12) in said mounted position thereof and angularly oriented in the direction of said first (14) holding surface effective to define a clearance space of a progressively diminishing extent between the longitudinal center of said threaded opening (19) and said first holding surface (14),
   said threaded opening (19) having a partial counterbore in said upper end effective to provide an angularly inclined third holding surface (25) in facing relation to said first holding surface (14), and
   a threaded member (21) with a round head having an operative position in threaded engagement within said threaded opening (19) incident to rotation thereof effecting said threaded engagement,
   said head of said threaded member being rotatable to said operative position wherein said head of said threaded member (21) is in direct abutment against said first side wall (15) of said tool insert (12) in wedge relation between said facing first (14) and third (25) holding surfaces and said tool insert end wall (18) in seated relation against said second holding surface (17), whereby said wedged relation results from wedging movement of said head of said threaded member (21) through said clearance space of progressively diminishing extent and said seated relation from rotation of said head of said threaded member (21) in the direction of said second holding surface (17) during said wedging movement.

2. A toolholder construction as defined in claim 1 including an anvil member mounted in an interposed position between said tool insert (12) and said toolholder body (10).

3. A toolholder construction as defined in claim 1 wherein said partial counterbore is conical and wherein said round head of said threaded member (21) is conical.

4. A toolholder construction as defined in claim 1 wherein said partial counterbore is cylindrical and wherein said round head of said threaded member (21) is cylindrical.

* * * * *